(12) United States Patent
Peabody et al.

(10) Patent No.: US 8,294,302 B2
(45) Date of Patent: Oct. 23, 2012

(54) SYSTEM FOR PROVIDING POWER AND DATA TRANSMISSION BETWEEN A DOOR AND A FRAME

(75) Inventors: Joshua Todd Peabody, Phoenix, AZ (US); Leland J. Hanchett, Jr., Cave Creek, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 427 days.

(21) Appl. No.: 12/778,502

(22) Filed: May 12, 2010

(65) Prior Publication Data

US 2010/0290542 A1 Nov. 18, 2010

Related U.S. Application Data

(60) Provisional application No. 61/178,605, filed on May 15, 2009.

(51) Int. Cl.
*H01F 27/42* (2006.01)
(52) U.S. Cl. ............................................. 307/104; 307/1
(58) Field of Classification Search .............. 307/1, 104; 375/258
See application file for complete search history.

(56) References Cited

U.S. PATENT DOCUMENTS

| | | |
|---|---|---|
| 4,929,005 A | 5/1990 | Heinen |
| 2002/0117896 A1 * | 8/2002 | Gohara ........................ 307/10.1 |
| 2008/0185918 A1 * | 8/2008 | Metz et al. ..................... 307/104 |
| 2009/0025435 A1 | 1/2009 | Popowski |
| 2009/0308116 A1 * | 12/2009 | Lambrou ........................ 70/277 |

FOREIGN PATENT DOCUMENTS

| | | |
|---|---|---|
| FR | 2677396 A1 | 12/1992 |
| WO | 0077330 A1 | 12/2000 |
| WO | WO 2006006834 A1 * | 1/2006 |
| WO | 2007082959 A1 | 7/2007 |

OTHER PUBLICATIONS

Buron, Emmanuel, "European Search Report," search completed Jun. 17, 2011, mailed Jul. 4, 2011 for European application No. 10 005 140.8, Rijswijk, Netherlands.

* cited by examiner

*Primary Examiner* — Daniel Cavallari
(74) *Attorney, Agent, or Firm* — Woods Oviatt Gilman LLP

(57) ABSTRACT

A system for providing wire-free and contact free electric power and communication connection in a security installation between a door and a frame. The cores, windings, and control circuits of first and second portions of a split core transformer are disposed in the frame and the door, respectively. Power applied to the first portion induces a voltage and current in the second portion when the door is in a closed position. Modulation of the voltage amplitude in either the first or second portion defines a communication signal between the door and the frame. Status and data are transmitted at data rates that are essentially twice the frequency of the voltage applied to the split core transformer. In a second embodiment, voltage transfer occurs at 20 KHz and data transfer is in the range of 100K baud.

33 Claims, 15 Drawing Sheets

SYSTEM FOR PROVIDING POWER AND DATA TRANSMISSION BETWEEN A DOOR AND A FRAME

RELATIONSHIP TO OTHER APPLICATIONS AND PATENTS

This application claims the benefit of U.S. Provisional Application No. 61/178,605, filed May 15, 2009.

TECHNICAL FIELD

The present invention relates to systems for providing electric power/communication between a first object and a second object; more particularly, to such a system wherein said first and second objects are not physically connected electrically; and most particularly, to such a system wherein components and circuitry enable such power/communication at a Baud rate of essentially twice the frequency of the voltage being transferred between the first and second objects or, in a second embodiment, voltage transfer is at 20 KHz and data transfer is in the range of 100K baud.

BACKGROUND OF THE INVENTION

It is known in the art of security and electrically-controlled locks to use keypads and other input devices to provide secure access to buildings or other objects, e.g., safes, automobiles, and the like. In conjunction with this trend, a need has also developed for transmission of various types of functions or information relating to a door secured in a frame. For example, it can be desirable in a security application to provide power across a frame-door gap to the region around a lock in order to energize an actuator, solenoid, motor, etc., or to recharge a battery used in engaging/disengaging the lock, or power an identification device located on the door. It can also be desirable to determine the status or lock-state of the lock, i.e., whether the locking mechanism is engaged or disengaged. This status information must in some way be acquired and transmitted across the door-frame gap to a monitoring device such as a computer controller. Information regarding whether a door is opened or closed may also be required.

Prior art systems transfer power and/or data between a door and a door frame using wires that run through a mechanical hinge point or a set of spring loaded contacts that provide an electrical connection across the frame-door gap when the door is in the closed position. The problem with such a wire-based approach is that only very fine wires can be used since such wire must pass internally through the plates of the door hinges to avoid being severed in normal operation or by an intruder. Spring-loaded contacts present a different set of problems relating to contamination of the contacts and the risk of shocking a person passing through the door who might make contact with the 'live' contact set on the frame.

What is needed in the art is a robust and efficient system that provides wire-free power transfer between a frame and a door and also enables information or communication transfer, all while avoiding the above shortcomings of prior art systems.

It is a principal object of the present invention to provide wire-free communications and power transmission between a door and a frame.

SUMMARY OF THE INVENTION

Briefly described, the present invention provides transfer of power and/or data from a first object to a second object, such as a frame to a door, utilizing a split core transformer wherein portions of the core and windings are located in both the door and the frame. Status and data may be transmitted between a device located in the door and a device in the frame at data rates that are essentially twice the frequency of the voltage applied to the primary side of the split core transformer or as much as about five times for the frequency of the applied voltage in an alternate embodiment.

A door and frame equipped in accordance with the present invention comprise mating elements of a system that provides wire-free and contact-free power transfer between the frame and the door and also enables information or communication transfer. The door frame comprises a receiver assembly having a recessed portion housing a first transformer core portion having first windings, and the associated door is provided with a spring-loaded protruding assembly fitted with a second transformer core portion having second windings. When the door is closed against the frame, the recessed portion in the frame is formed to receive the spring-loaded protruding assembly of the door whereby the first and second core portions are aligned and brought into such close proximity as to minimize the air-gap between the cores, allowing transfer of power/data via magnetic induction from one transformer portion to the other. Such power/data may flow bi-directionally from either of the transformers halves to the other.

Power may be provided across the frame/door gap to energize a solenoid for locking the door or to recharge a battery located in an identification device, such as an electronic combination locking device on the door. Preferably, a sensing winding is provided adjacent the primary winding of the first portion of the split core transformer to capture modulated alternating current from the secondary winding that is located on the second portion of the split core transformer.

Additional benefits of the above described system and method for providing power and data communication respecting a door and lock are set forth in the following discussion.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
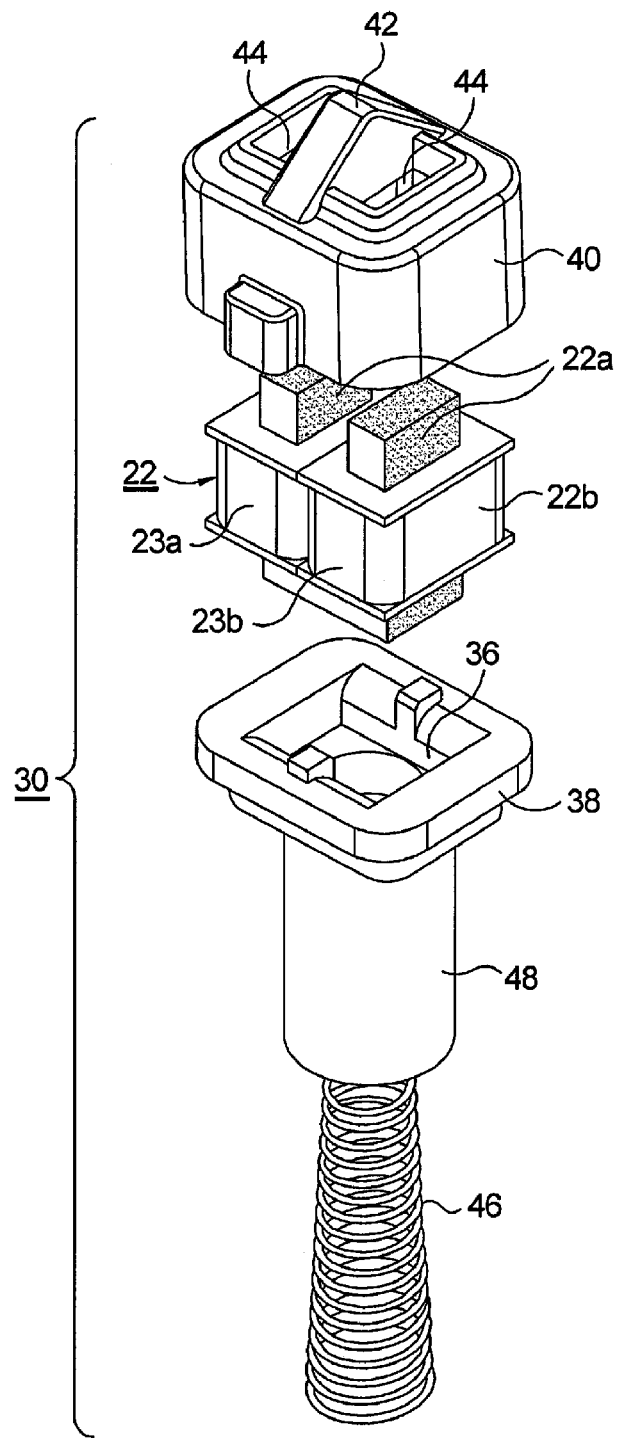
FIG. 1 is an exploded isometric drawing of a spring-loaded protruding subassembly in accordance with the present invention comprising a second transformer.

In general, the system described herein for providing power and data transfer in accordance with the present invention may be implemented in a variety of hardware and software embodiments or combinations thereof.

This description is organized as follows: first, an exemplary environment to which the present invention would be applicable is described; next, exemplary components and physical configuration of the exemplary environment are described; following this, representative circuitry for enabling the present invention is presented; and finally, exemplary communication resulting from the implementation and use of the invention is described.

Referring now to FIGS. 1 through 9, the present invention generally relates to a system 10 which contains a method for providing power to an entry system device 12 (also referred to herein as a protruding assembly 12) located on a door 14 hinged in a frame 16 and for providing data transfer between an entry system device 12 and a receiver device 18 on the frame side of the door through a split core electromagnetic transformer 20 comprising first and second transformers 24, 22 disposed respectively in a receiver assembly 18 and entry system device 12. The present invention provides circuitry to enable such communication to occur at a Baud rate of essentially twice the frequency of the voltage being transferred between the door and frame side.

Figure 9:
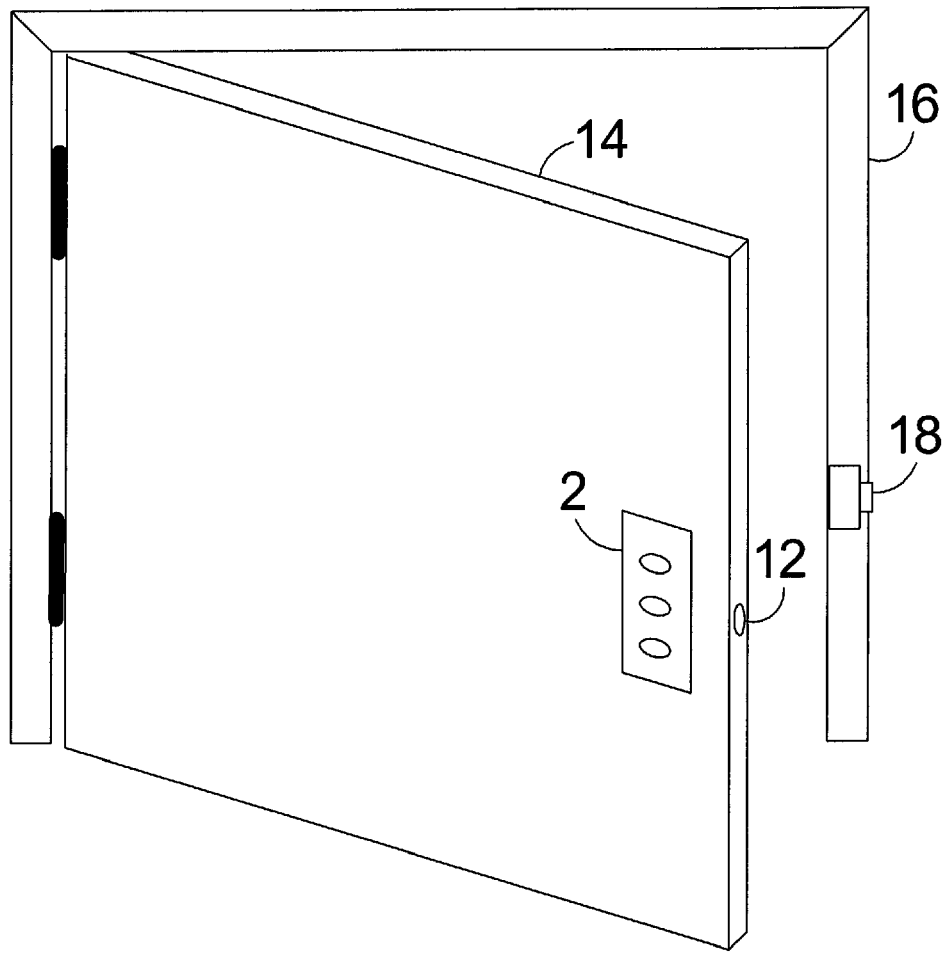
FIG. 9 is an isometric view of an exemplary installation in accordance with the present invention, showing an open door hinged in a frame, the door being equipped with a protruding assembly in accordance with FIGS. 1-3 and the frame being equipped with a receiver assembly in accordance with FIGS. 4 and 5.

The present invention is applicable to doors, windows, or other objects that are moveable relative to a frame or other fixed object, wherein there is a need to communicate without direct electrical connection between a device located on the first object and a device located on the second object. The invention is described herein with reference to an exemplary environment such as is shown in FIG. 9, wherein the first object is door 14 and the second object is door frame 16. As shown, door 14 may have attached thereto an electronic combination lock 26 or other similar entry system device such as a biometric reader, magnetic card reader, and the like. Importantly, such a device, such as electronic combination lock 26, requires communication with frame 16 and/or a supply of power from the frame side. Communication between door 14 and frame 16 may be for the purpose of exchanging information regarding such things as lock status or the keyed or inputted entry data provided at the lock, or to enable the reconfiguration of lock 26 with a new combination. Power to lock 26 may be required for normal operation or to recharge a battery (not shown) located therein. As will be appreciated by one skilled in the art, combination lock 26 may activate a protruding assembly 12, a solenoid (not shown), or other similar mechanism for latching, locking, opening, or otherwise maintaining the door in a particular position. In the presently described embodiment, protruding assembly 12 engages a receiver assembly 18 when the door is in the closed position.

Figure 6:
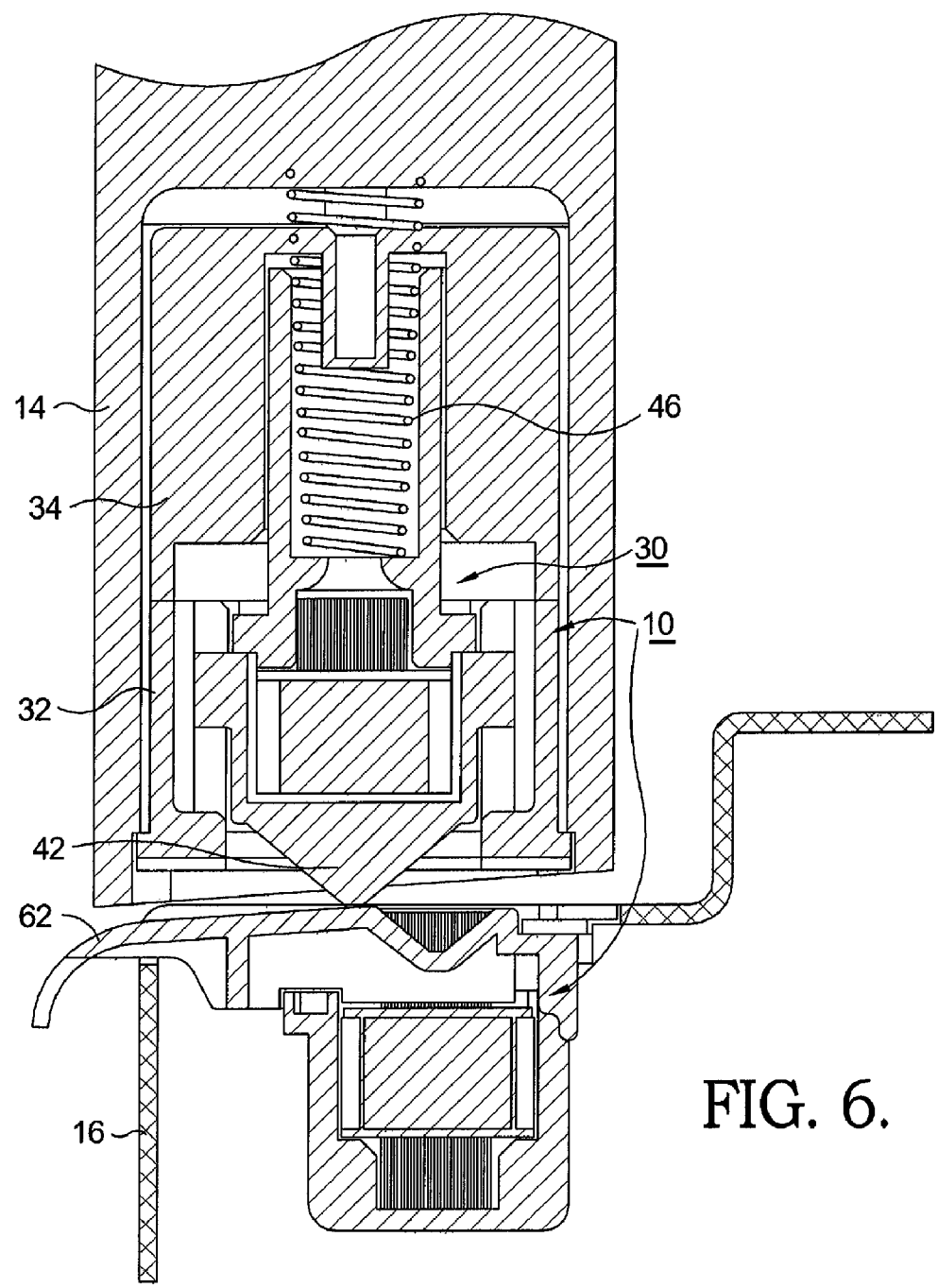
FIG. 6 is a first elevational cross-sectional view of a system for providing power and data transmission in accordance with the present invention, taken through the center of the protruding assembly and the receiver assembly and showing the protruding assembly shown in FIGS. 1-3 engaged but not yet nested with the receiver assembly shown in FIGS. 4 and 5.
Figure 7:
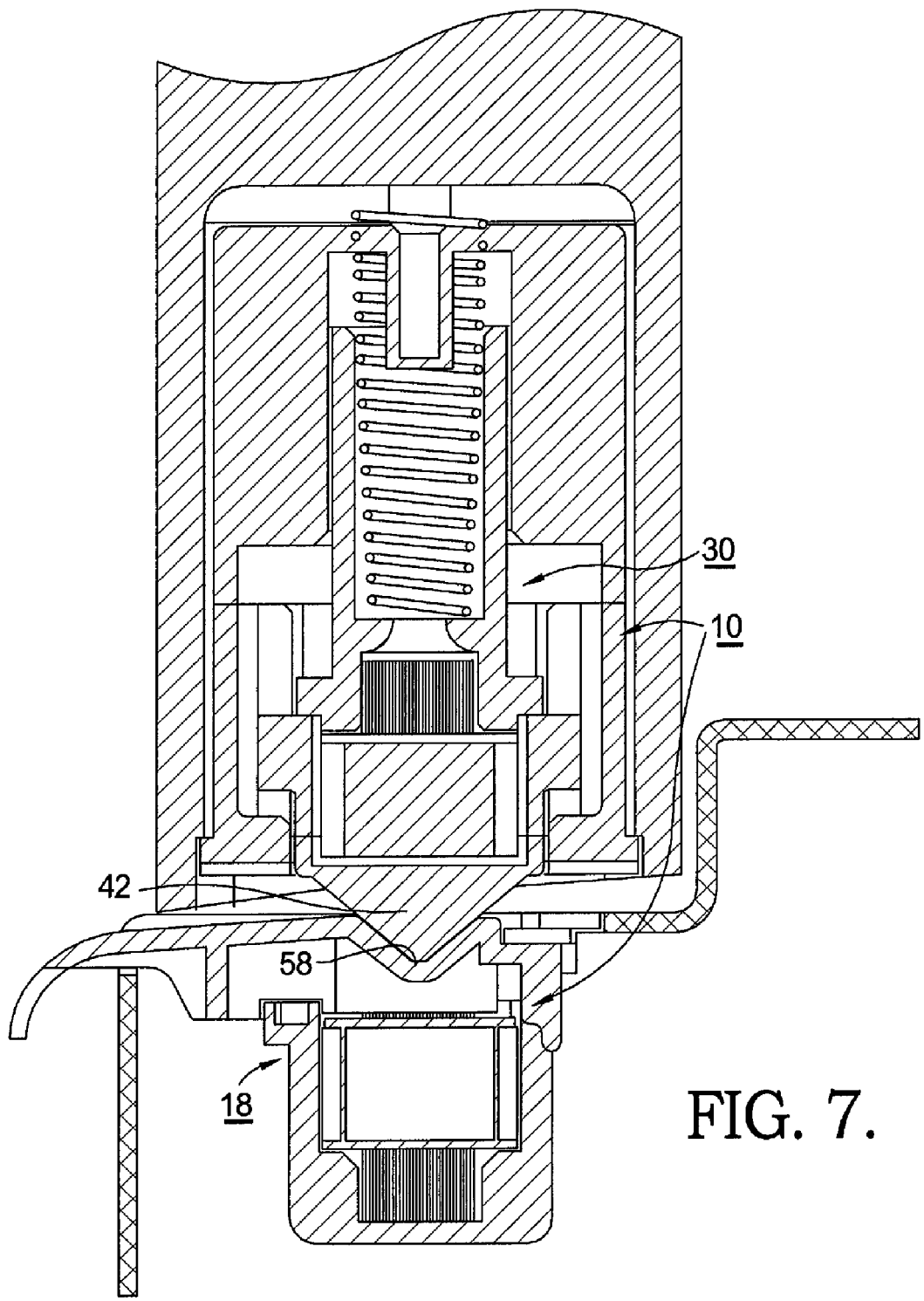
FIG. 7 is a sequential elevational cross-sectional view to that shown in FIG. 6, showing the protruding assembly engaged and nested with the receiver assembly.
Figure 8:
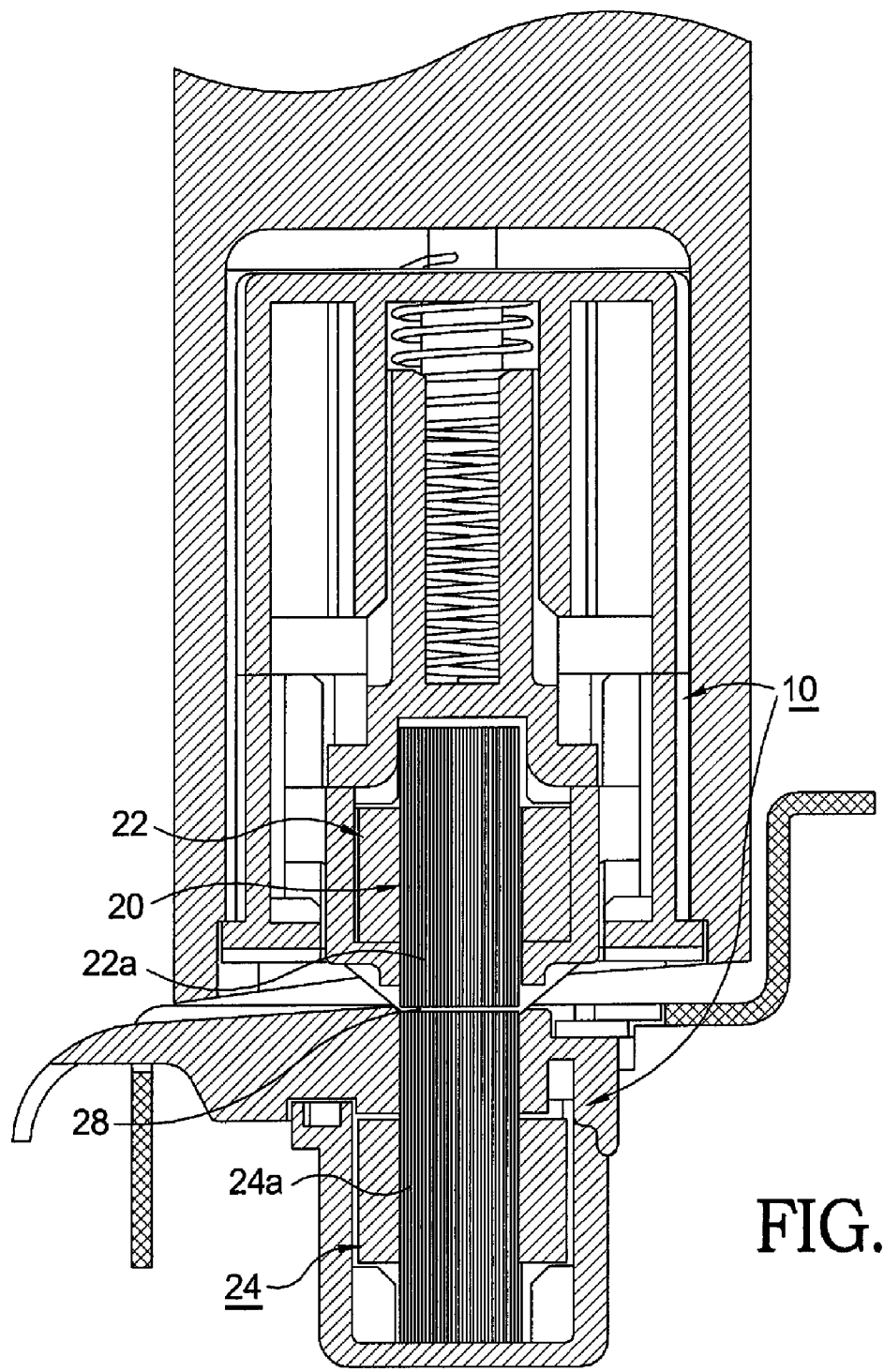
FIG. 8 is a second elevational cross-sectional view taken parallel to the view shown in FIG. 7, showing the relationship of the cores of the first and second transformers when the protruding assembly is nested with the receiver assembly.

The system and method for the transfer of power and subsequently for the communication of data between door 14 and frame 16 may be described with initial reference to the perspective view of a split transformer 20 having a first transformer portion 24 and second transformer portion 22, as shown in FIGS. 6 through 8. It will be appreciated by one skilled in the art that a split core transformer 20 comprises two core halves 22a,24a each having one or more windings 22b, 24b, the two halves being brought together in operation in as close a configuration as possible so as to reduce or eliminate any air-gap 28 (FIG. 8) between the cores halves 22a,24a of each portion 22,24. The illustrated second transformer portion 22 comprises a U-shaped core half 22a having a pair of coil windings 23a,23b located on each leg of core half 22a. First transformer portion 24 similarly comprises a U-shaped laminated core half 24a and a pair of coil windings 25a,25b.

Figure 2:
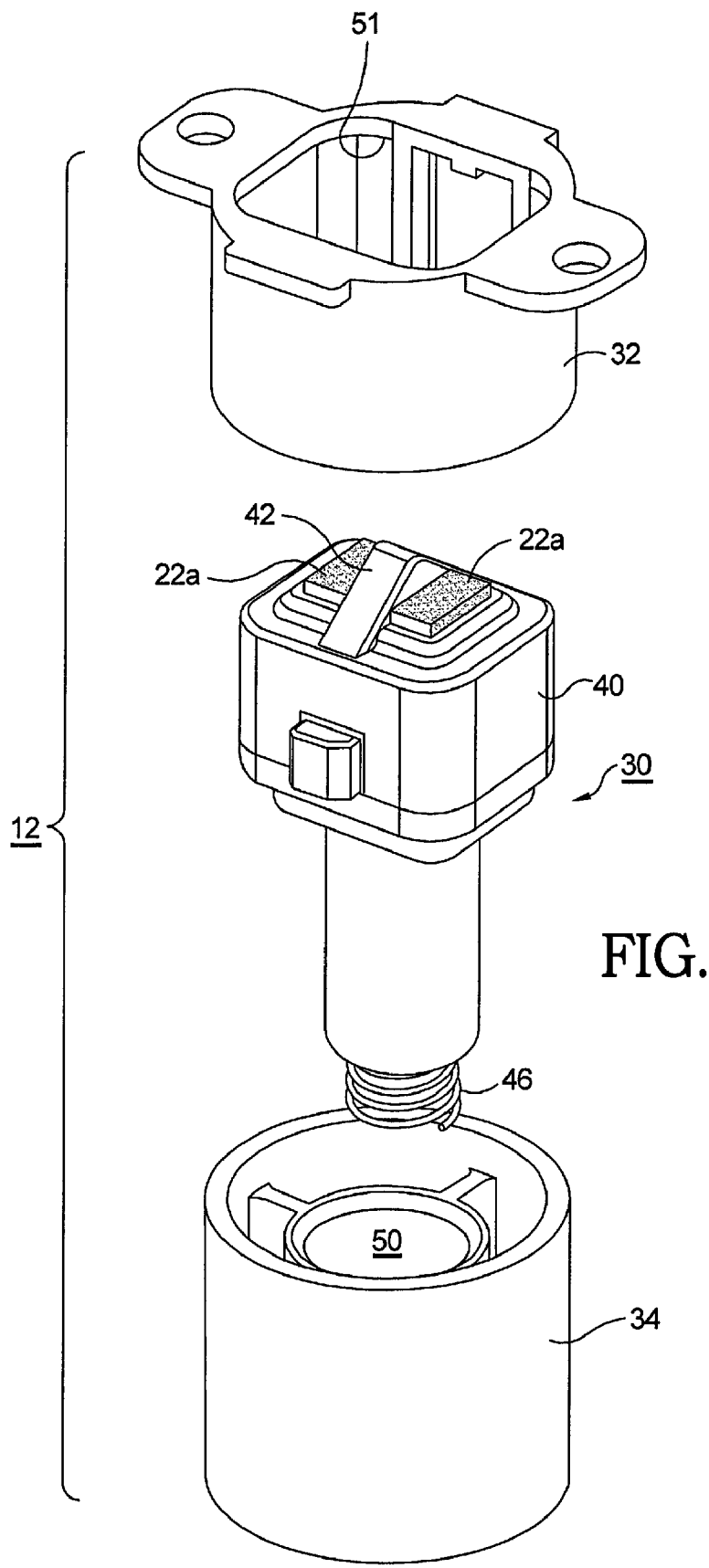
FIG. 2 is an exploded isometric drawing of a protruding assembly in accordance with the present invention comprising the subassembly shown in FIG. 1.
Figure 3:
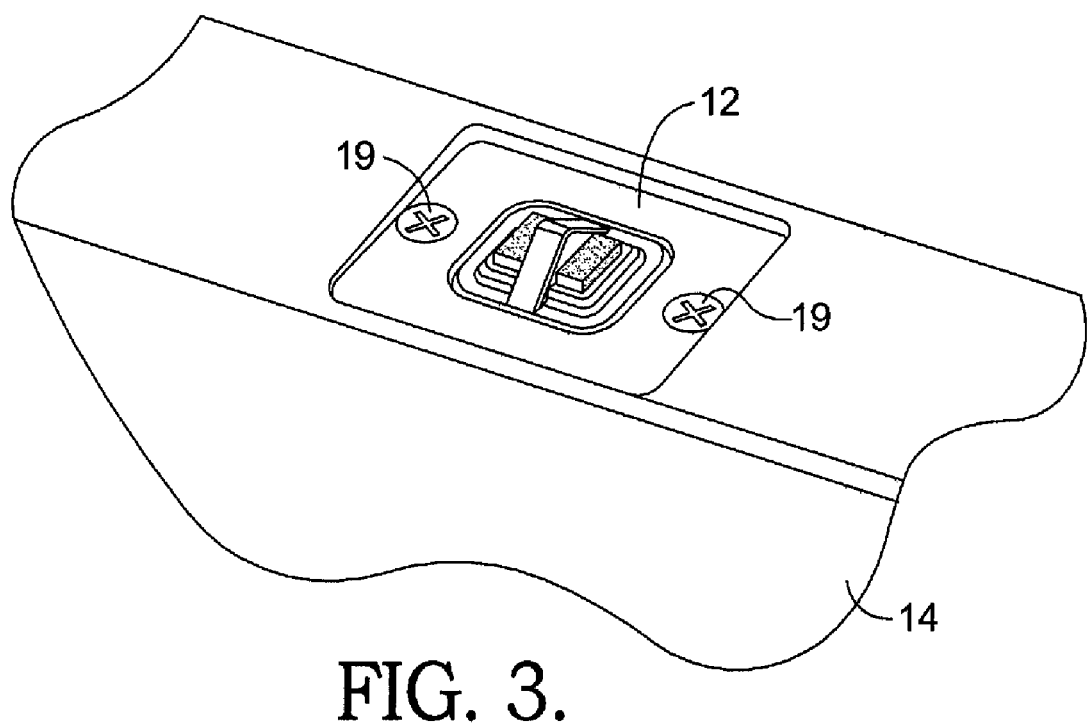
FIG. 3 is an isometric drawing showing the protruding assembly shown in FIG. 2 mounted in a second object such as a door or frame.

Referring now specifically to FIGS. 1 through 3, protruding assembly 12 comprises a protruding subassembly 30, an upper housing 32, and a lower housing 34 for receiving subassembly 30. Protruding subassembly 30 comprises second transformer 22 as described above received in a well 36 in a lower fixture 38 and captured therein by an upper fixture 40 having a ramped portion 42 separating first and second openings 44 for receiving core portions 22a. A compression spring 46 is seated in a spring retainer portion 48 of lower fixture 38. As received in upper and lower housings 32,34, spring 46 is compressively disposed in well 50 in lower housing 34. Upper fixture 40 is slidably disposed in upper housing 32 and is urged against end flange 51 by spring 46. During engagement of protruding assembly 12, subassembly 30 is free to be displaced axially within upper housing 32 and upon latching is returned by spring 46 to a predetermined correct position against flange 50 whereby core portions 22a are extended a correct distance through openings 44 in upper housing 40.

Figure 4:
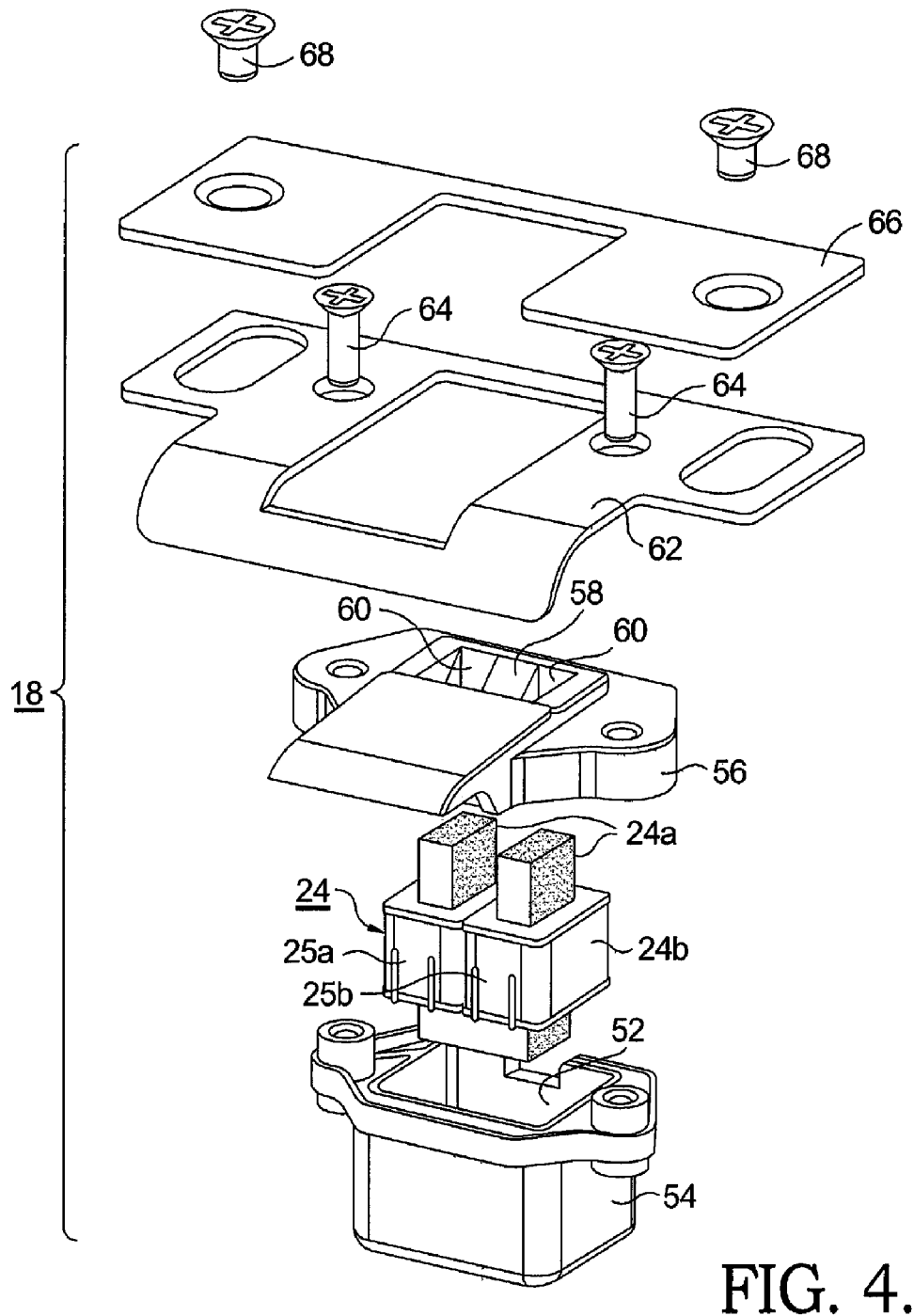
FIG. 4 is an exploded isometric drawing of a receiver assembly in accordance with the present invention comprising a first transformer.
Figure 5:
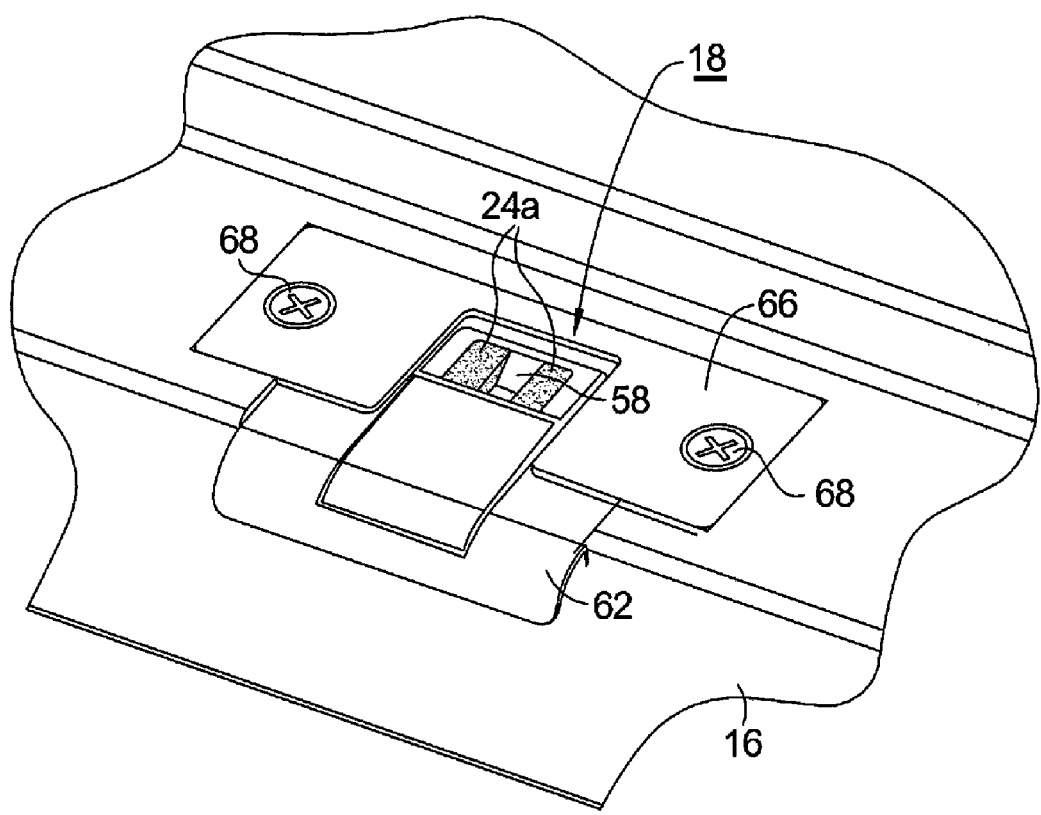
FIG. 5 is an isometric drawing showing the receiver assembly shown in FIG. 4 mounted in a first object such as a mating frame.

Referring now to FIGS. 4 and 5, protruding assembly 18 comprises first half transformer 24 disposed in a well 52 in lower receiver housing 54 and is retained therein by upper receiver housing 56 having protruding assembly receiver 58 separating first and second openings 60 for receiving legs of core half 24a of first transformer 24. Striker plate 62 is secured to upper receiver housing 56 by screws 64, and assembly 18 is secured to frame 16 by retainer 66 and screws 68. Lower and upper receiver housings 54, 56 are formed such that the legs of core half 24a are extended a correct distance through openings 60 in upper housing 56.

In operation, protruding assembly 12 and receiver assembly 18 are located, respectively, in each of door 14 and frame 16; i.e., protruding assembly 12 is bore-in installed in the edge of door 14, and receiver assembly 18 is recessed into frame 16. First and second transformers 24,22 are sized and dimensioned to fit within the respective components of the frame 16 or door 14. Further, first and second transformers 24,22 are located so as to be aligned and in close proximity for proper operation when door 14 is latched into frame 16. That is, first and second transformers 24,22 are positioned one with respect to the other in at least one position that defines a magnetic circuit, enabling a variable current in either of second coil windings 23a,23b or first coil windings 25a,25b to induce a magnetic flux in its respective core 22a or 24a and thereby inductively create an electric current in the other coil 23a,23b or 25a,25b. Additionally, protruding assembly 12 may be housed within door 14 with set screws 19 (FIG. 3), which may also be utilized to adjust the depth of penetration of the protruding assembly 12 into door 14. This adjustment provides yet another means to minimize the air-gap 28.

In a first embodiment, coil winding 25b is a sense winding designed to have fewer windings than coil winding 25a of core half 24a. In a second embodiment, there are windings for power transfer, and transmit and receive, for both door and frame.

In a typical installation, first transformer portion 24, being mounted in the fixed frame, is connected to an external source of power (not shown) which produces current and voltage inductively in second transformer 22 mounted in door 14; however, it is obvious that power produced in transformer portion 22, as by a battery (BAT1, FIG. 10) disposed in door 14, can create current and voltage in transformer portion 24. Thus, data transfer is possible in both directions between door 14 and frame 16.

Referring now to FIGS. 6 through 8, in operation, as door 14 closes within frame 16, protruding ramp 42 engages and rides up the inclined surface of strike plate 62 (FIG. 6). Protruding subassembly 30 slides axially within upper and lower housings 32,34, compressing spring 46. Further travel in the direction of door closing (FIG. 7) allows protruding ramp 42 to be urged by spring 46 into receiver 58 in receiver assembly 18, as shown.

When door 14 is in the closed position within the frame 16 receiver assembly 18 is adapted and aligned to receive the protruding ramp 42 in a fit and manner as to align (FIG. 8) the opposing core halves 24a,22a of first and second transformers 24,22 and to minimize air gap 28 there between. This closed door configuration of the transformers enables the transfer of power and data between the door 14 and frame 16 when an alternating current is applied to the frame side transformer 24 by utilizing circuit present in door 14 in cooperation with door transformer portion and circuit present in frame 16.

Note that in all FIGS. 1 through 9, conventional connecting wiring is assumed and is therefore omitted for clarity.

Figure 10:
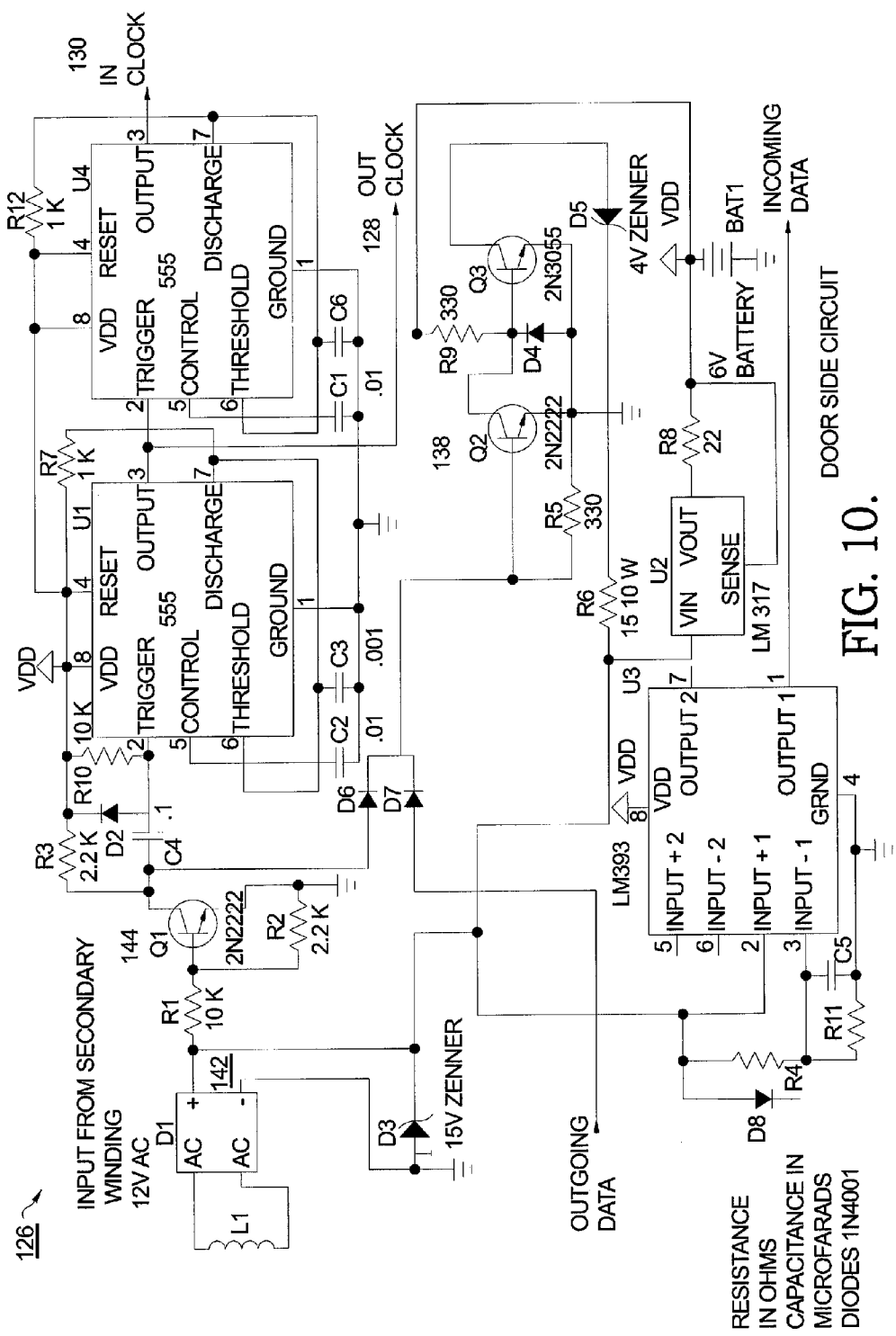
FIG. 10 is a schematic diagram of an exemplary circuit for implementing the door side of the present invention.
Figure 11:
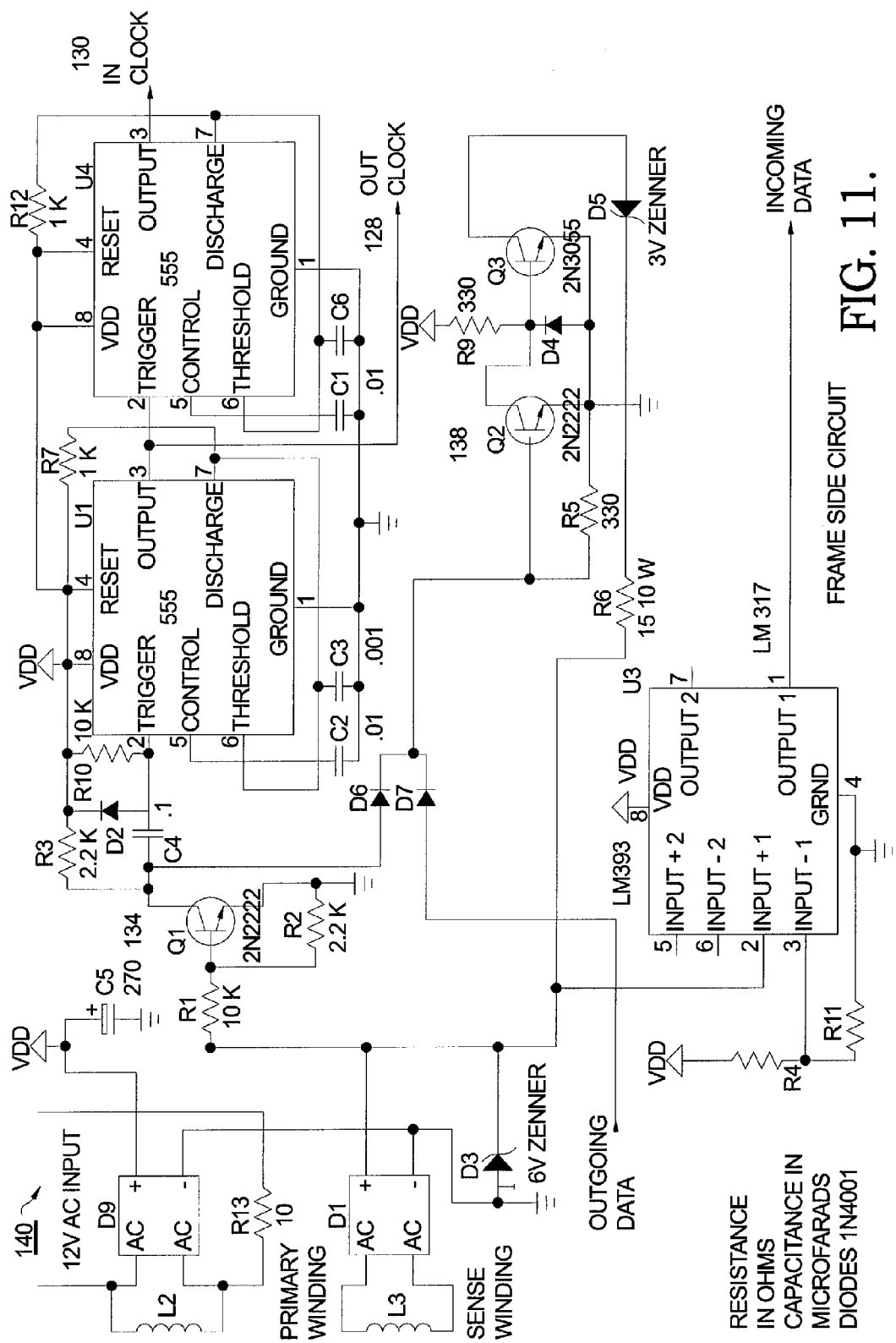
FIG. 11 is a schematic diagram of an exemplary circuit for implementing the frame side of the present invention.
Figure 12:
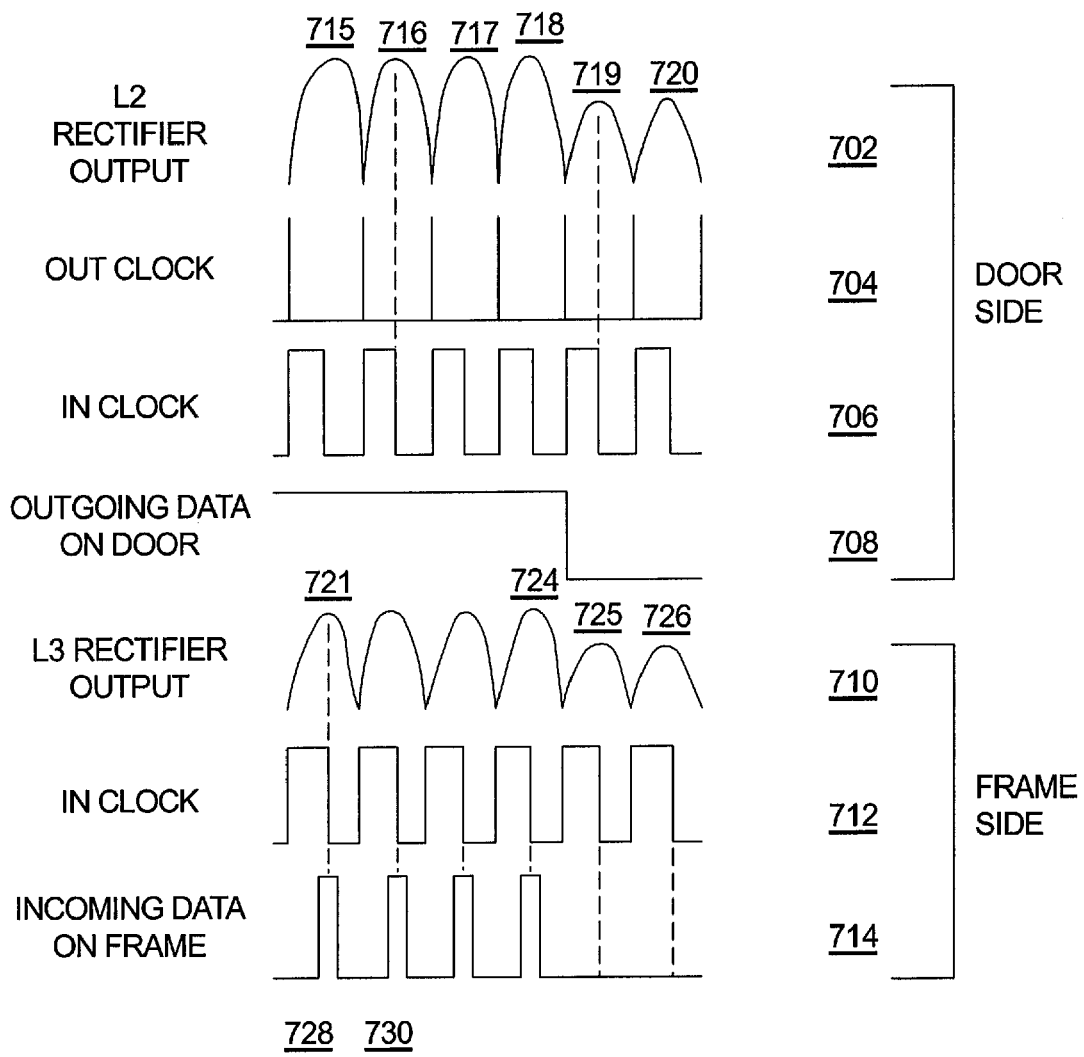
FIG. 12 is an exemplary timing sequence of signals and data transmission between the door and frame in the preferred embodiment of the present invention.

Referring now to FIGS. 10 through 12, the present invention further comprises circuitry of components that are utilized to provide the necessary signaling between door 14 and frame 16 and any remote stations. Some of the circuitry is located on the door and some on the frame.

FIG. 10 is a schematic diagram illustrating an exemplary implementation of a door side circuit 126. The various components of circuit 126 provide the timing sequences 702 through 708, shown in FIG. 12, that enable the receipt of power and the transmission of data between door 14 and frame 16. Circuit 126 comprises, among other components, a secondary winding L1, a bridge rectifier D1, a voltage regulator U2, a comparator U3, a pair of 555 timer integrated circuits U1, U4 and a number of transistors, diodes, capacitors and resistors, all of which enable the receipt of power to charge a battery and/or transfer data to/from the frame side.

Secondary winding L1 represents the core windings 23a, 23b of door transformer 22. In operation, the secondary winding L1, which is powered through conventional transformer operations, receives an input voltage of approximately 12 Volts AC to provide a sine wave at a frequency of between 60 and 60,000 Hertz. The secondary winding L1 is in electrical connection with bridge rectifier D1. Bridge rectifier D1 converts the sine wave to a full wave rectified signal 142, as shown in sequence 702. In order to prevent fly back voltage across L1, zener diode Z3 is located in parallel across the output terminals of the rectifier D1. The full wave rectified signal 142 is applied to the voltage regulator U2, the base of transistor Q1 and to an input comparator U3.

The rectified signal 142 applied at regulator U2 provides the necessary voltage $V_{out}$ to charge a built-in battery such as BAT1. As illustrated in the circuit 126, the built in battery is charged through a resistor R8. A voltage regulator such as LM 317, available from National Semiconductor Corp., Santa Clara, Calif., meets the necessary specifications to support the configuration of this embodiment of the present invention.

Rectified signal 142 applied to the base of transistor Q1, which has its conduction path (collector to emitter in the case of a Bipolar Junction Transistor (BJT)) reverse-active, provides an inverter function. The rectified signal 142 is applied to Q1 across a voltage divider of R1, R2 to provide inverted signal 144. The inverted signal 144 is applied through resistor R10 and capacitor C4 to edge-detect the pulse of the signal and apply a negative going trigger to the timer U1.

Timer U1 is adapted to operate in the monostable mode and thereby function as a "one-shot". By manipulating an RC network circuit signal to the threshold and reset inputs of the timer U1, the interval for the pulse of the timer U1 output may be adjusted. In a currently preferred embodiment of the present invention, capacitor C3 and resistor R7 are selected to set the timing interval for the one shot to be approximately one micro second (1 ρSec).

Time interval T=RC ln(3) where R=1K ohm and C=0.001 μFarad.

The resulting output signal of the timer U1 is shown in sequence 704. The output signal of timer U1 is used to provide a clock signal—Out Clock 128, for an outgoing data shift register (not shown). The data shift register would contain any output data from door 14 that is required to be transmitted to the frame 16 and beyond to other remote units or devices.

The output clock signal of timer U1 is also used to trigger a second one shot timer U4, which in turn provides a clock signal, In clock 130 shown in sequence 706. In clock 130 is utilized for clocking incoming data to the door side. More specifically, In clock 130 is utilized to move a detected data stream in a data received shift register (not shown). Capacitor C6 and resistor R12, determine the timing interval/pulse duration for timer U4.

The full wave rectified signal 142 is further applied to voltage comparator

U3. In the presently preferred embodiment of the invention, comparator U3 is an LM 393 comparator, available from National Semiconductor Corp. that provides support for dual voltage offset comparisons. The rectified signal 142 is applied to non-inverting Input +1 of the comparator U3. The other input to the comparator U3 is a time-averaged slightly attenuated version of the full wave rectified signal 142 and it is applied to inverting Input −1. This scheme maintains tracking for the comparator U3 in the event that the input from the secondary winding L1 rises or decreases for any unforeseen circumstances. Output 1 of the comparator U3 provides a data stream which may then be routed to a data receive shift register (not shown), i.e., a register for holding incoming data to the door 14.

Returning to the transistor Q1, the signal on the collector 144 is OR'ed with the output stream, shown in sequence 708, from the outgoing shift register (not shown), using diodes D6, D7. The combination of the two signals is applied to transistor Q2, the output of which i.e., collector 138 is then applied to the base of transistor Q3. The collector of transistor Q3 provides a signal that is used to lower individual half cycles of the full wave rectified signal 142 emanating from the bridge rectifier D1 through zener diode D5 and resistor R6, which in effect lowers the impedance seen by the secondary winding L1 on door 14.

Having described the circuitry and the associated timing sequences that enable power transfer and data communication on door 14, attention is directed next to the frame side circuitry and related timing sequences.

FIG. 11 illustrates a schematic circuit diagram 140 of an exemplary implementation of a circuit for the frame side of the present invention. The various components of the circuit 140 provide the timing sequences 710 through 714 shown in FIG. 12. Circuit 140 comprises among other components a primary winding L2 and a sense winding L3 of transformer windings 25a,25b, a bridge rectifier D9, a comparator U3, a pair of 555 timer integrated circuits U1,U4 and a number of transistors, diodes, capacitors and resistors, all of which enable the transfer of power and communication to/from door 14.

In operation, a 12 Volt alternating current source is electrically connected and applied to the primary winding L2 of the second transformer 24 through resistor R13. Primary winding L2 in the circuit 140 represents the coil windings 25a,25b. Resistor R13 serves to limit the current applied to the primary winding L2 when the two transformers 22,24 are separated, i.e., when door 14 is in an open position. The 12 Volt alternating current source is also applied to bridge rectifier D9. The output of the rectifier D9 is applied to the non-inverting Input +1 of the comparator U3 through zener diode D3. A reference voltage is divided across resistors R4, R11 and applied to the inverting Input −1 of the comparator U3. This configuration with the reference voltage enables variations in input voltage applied to Input +1 to be tracked at the Output 1 of the comparator U3.

The sense winding L3 is powered through conventional transformer operations via the primary winding on the frame side, i.e., L3 has an induced current and ultimately voltage, determined by the primary winding on the frame 16 and the ratio between L3 and L2. Sense winding L3 captures the modulated alternating current signal from the primary side of the transformer. In effect, a sine wave is produced across L3 on frame 16 side by virtue of the sine wave present on the primary winding, L2 as earlier described. As a result, sense winding L3 may provide detection of the open or closed condition of door 14. In other words, when the door is open, i.e., transformers 22, 24 are not aligned, there is significantly reduced voltage across the sense winding L3, since the magnetic field is no longer complete. A symbiotic relationship between the door and the frame is created by the interdependent coil scheme of the present invention. Sense winding L3 can also be used to affect the signal present on the door side of the split transformer arrangement.

On the frame side, the sine wave from winding L3 is provided to the bridge rectifier D1. Rectifier D1 converts said sine wave to a full wave rectified signal as shown in sequence 710. The resulting full wave rectified signal is applied to the base of transistor Q1 through resistor R1, resulting in an inverted signal at the collector of Q1. This inverted signal is applied to capacitor C4 and resistor R10, which serve to edge detect the pulse and apply a negative going trigger to the one shot circuit of the 555 timer U1.

Similar to the previous discussion respecting the door side circuitry, capacitor C3 and resistor R7 set the timing interval for the one shot at approximately one microsecond. The resulting output signal of timer U1 is used to provide a frame side out-clock signal 128 for the outgoing data shift register (not shown) containing output data to be transmitted across the power and data link of door 14 and frame 16. The clock signal 128 is then used to trigger the next one shot 555 timer U4, which in turn provides an in-clock signal 130 for the incoming data to frame 16. The pulse duration of the in-clock signal 130 is set by capacitor C6 and resistor R12. In the preferred embodiment of the present invention, the pulse duration is approximately four milliseconds in length.

The third electrical connection of the full wave rectified signal of sequence 710 is applied to the non-inverting input +1 of the comparator U3. The other input to the comparator U3, i.e., inverting input −1, may be filtered by a capacitor such as is shown on the door side, or merely just voltage divided by resistors R4 and R11 as shown in circuit 140. The output of comparator U3 provides a data stream that may be routed to the data receive shift register (not shown) for the frame side. An exemplary output of the comparator is shown in timing sequence 714.

The signal on collector 134 of transistor Q1, i.e., the inverted signal of sequence 710, is OR'ed with the outgoing data stream (sequence 708) from the outgoing data shift register (not shown) using diodes D6, D7. The combination of the two signals i.e., inverted sequence 710 and sequence 708, is applied to transistor Q2. The output of Q2 is then applied to the base of transistor Q3. The collector of transistor Q3 provides a signal that is used to lower individual half cycles of the full wave rectified signal emanating from the bridge rectifier D1 through zener diode D5 and resistor R6, which in effect lowers the impedance seen by the sense winding L3. The zener diode Z3 prevents a fly back voltage across L2 and L3.

A communication protocol is provided to ensure that only one side of the door-frame interface is communicating at any given time. The timing sequence of FIG. 12 particularly illustrates the inventive data rate feature of the present invention. Specifically, the rectified output signal on the frame side is shown in sequence 702. As shown, the sequence 702 comprises a number of full voltage half cycles 715-718 and reduced voltage half cycles 719-720. When the rectified signal 146 is applied to the rest of the circuit 140 as described earlier, the outgoing data signal shown in sequence 708 is produced. Sequence 708 illustrates a high signal or "1" for the four half cycles 715-718 and low signal—"0" for the next two half cycles 719,720.

The sensing winding L3 in accordance with described circuit 140, receives a smaller amplitude wave form, shown in sequence 710. Notably, the frequency and cycles of sequence 710 are consistent with those of sequence 702, from the rectifier D1.

The incoming data sequence 714 on the frame side is a sequence of pulses occurring and centered on the peak amplitude of the sense winding L3 rectifier output 146 that is shown in sequence 710. Notably, a pulse representing a "1" occurs for each full half cycle wave 721-724 of the frame side sense winding sequence 710. A "0" or no pulse is present for each non full half cycle wave 725,726. More significantly, the incoming signal of sequence 714, which is on the frame side, is consistent with the outgoing signal of sequence 708 from the door side. Furthermore, the data rate of the incoming signals of sequence 714 is essentially twice the frequency of the sinusoidal wave which was originally induced from the door winding L1 to the sense winding L3 of the frame. This aspect is manifest by comparison of the timing sequences 702,710 and 714, wherein there are two data signals in 714 for the two half waves 715,716 and 721,722 which represent a single period of the sinusoidal waveform provided between windings L1 and L3.

In a second embodiment of the present invention three winding sets L4, L5, L6 are utilized in each of the door and frame side circuits to provide power and data transmission. Winding set L4, is utilized to transmit data from the door to the frame side; winding set L5 is utilized to provide power between the frame and door sides; and winding set L6 is utilized to transmit data from the frame to the door side. Similar to the first described embodiment of the present invention, this alternate embodiment employs a power transfer portion that can resonate both a frame primary winding L5$a$ and a door secondary winding L5$b$ portion of the winding set L5 to permit some displacement between core halves. Differently however, two "data-only" winding sets L4, L6 are incorporated into this design. L4, L6 comprise primary and secondary coils on each of the frame and door halves to provide isolated input and output circuits for transmitting and receiving data in either direction. Preferably, data flows in one direction on one of the winding sets and the other direction on the other of the winding sets. The second embodiment of the present invention is best described with reference to FIGS. 13-15.

Figure 13:
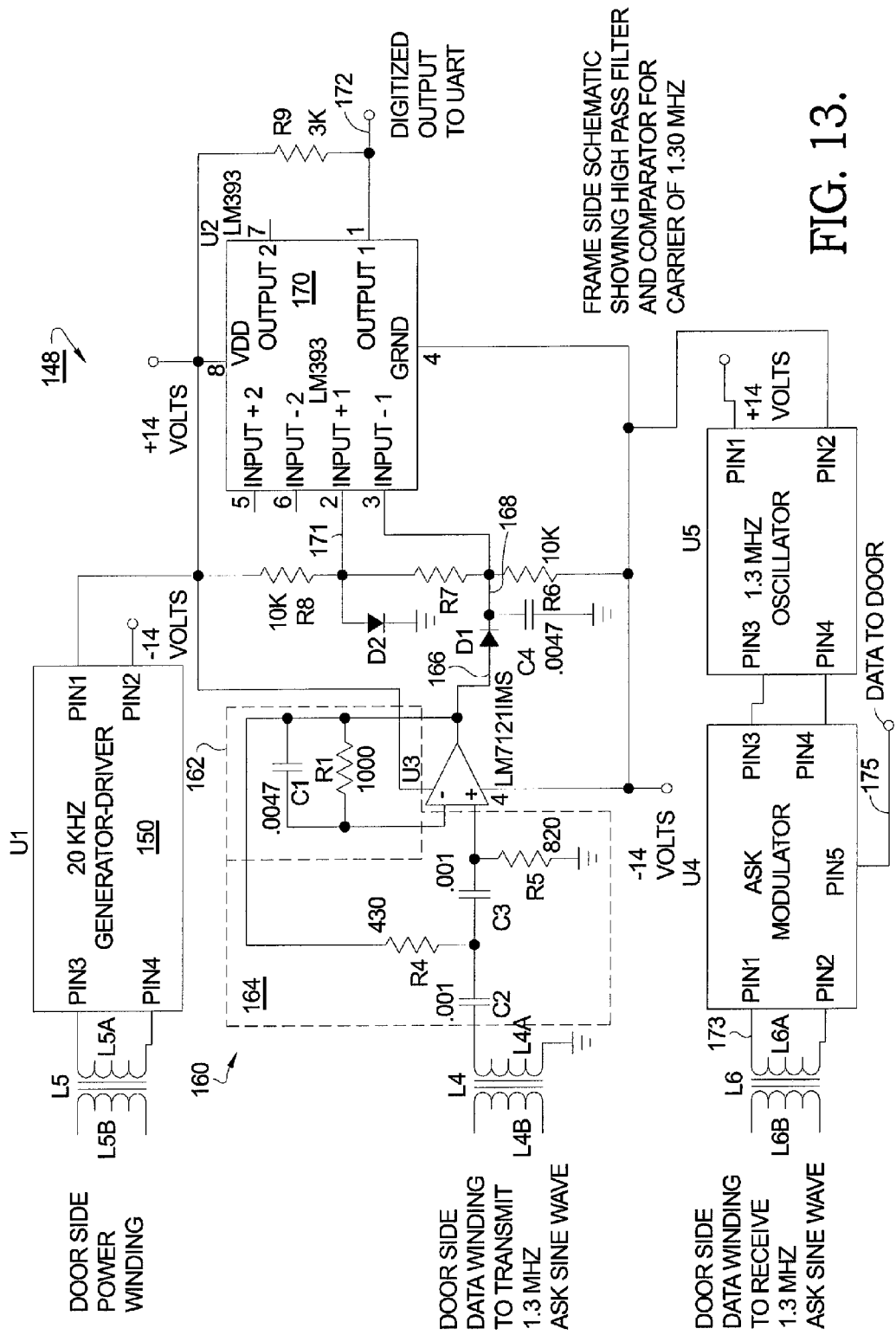
FIG. 13 is a schematic diagram of an alternate embodiment of an exemplary circuit for implementing the frame side of the present invention to support bi-directional high speed data communications.

FIG. 13 provides an illustrative schematic diagram of a circuit 148 that may be implemented on the frame side of the alternate embodiment of the present invention. Circuit 148 comprises power winding set L5 connected to a 20 KHz generator driver 150. The generator 150 drives the primary coil L5$a$ of the power winding set L5 in order to provide power from the frame side to the door side. A more detailed view of the generator is illustrated in FIG. 14.

Figure 14:
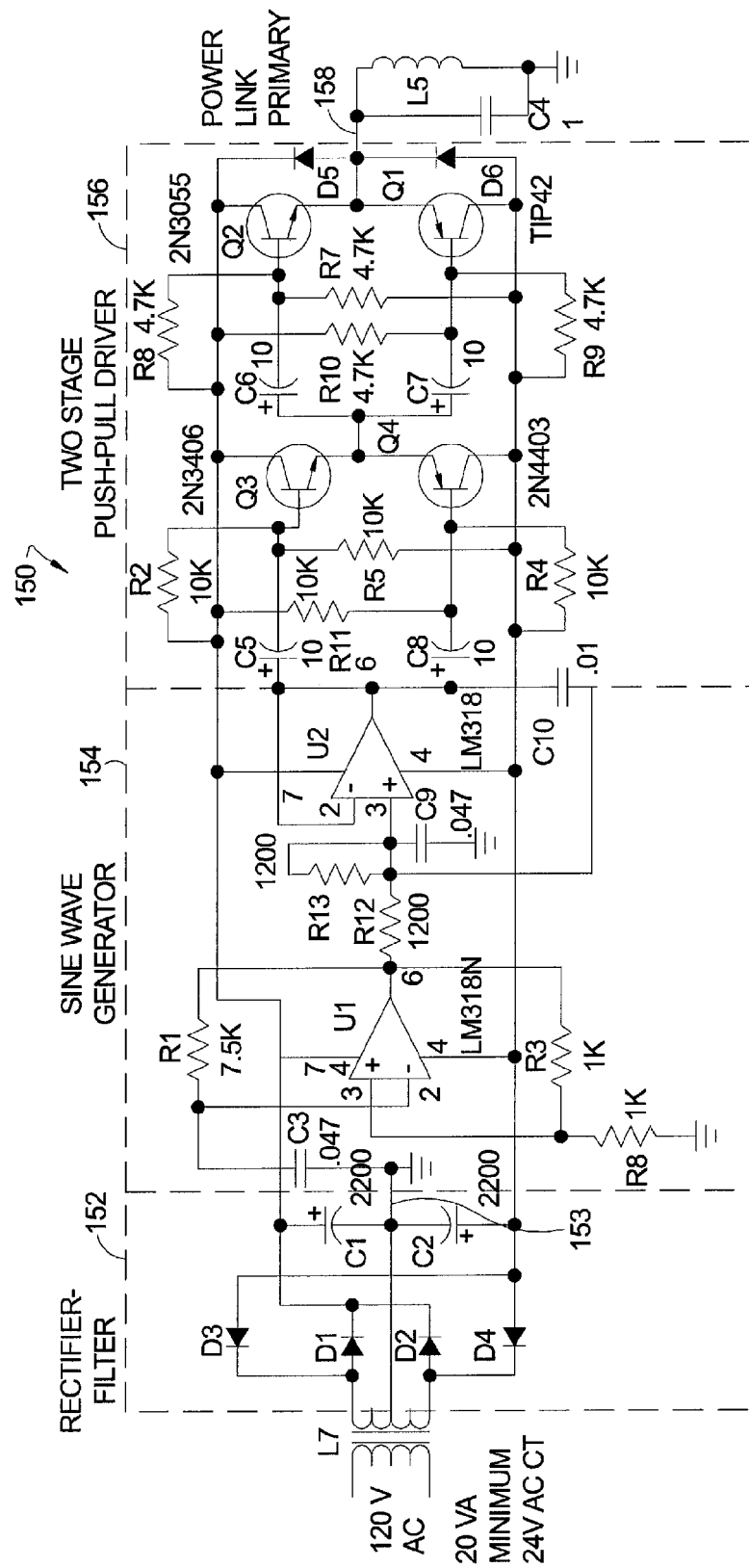
FIG. 14 is a schematic diagram of an exemplary 20 KHz sine wave generator for providing power from the frame sided of FIG. 13 in the present invention.

As shown in FIG. 14, the generator 150 generally comprises a rectifier-filter 152, a sine wave oscillator 154 and a two stage push-pull driver 156. The generator driver 150 is utilized to provide frequencies in the high audible range or above, so that a person with a normal hearing range or frequency would not be disturbed by the sounds emanating from the device. A traditional power supply source of 120 VAC is applied to a center tapped transformer L7 to provide 24 VAC. The output of the transformer L7 is rectified utilizing diodes D1, D2, D3, D4 and then filtered by capacitors C1, C2. The filtered signal powers the dual op amp sine wave oscillator 154. Sine wave Oscillator 154 comprises dual operational amplifiers U1, U2.

The sine wave oscillator 154 generates a sine wave by first generating a square wave, at the required frequency, utilizing amplifier U1 which is configured as an astable oscillator with a frequency that is determined by R1 and C3. Amplifier U2 provides a low pass filter that filters the square wave output from U1. The filter U2 is configured to have a cut off frequency equal to the square wave frequency from U1 and thus provides a sine wave at a frequency determined by the associated circuit component resistors and capacitors. In this embodiment, the desired frequency of 20,000 Hz is attained by providing a capacitor C3 having a value of 0.0047 µfd and based on these values, the values of components R1, C9, C10 and R12 are then calculated. The relevant equations for the component selection may be described as follows:

$$C9=C3$$

$$C10=2C1$$

$$R1=1;2F/(0.693*C1)$$

$$R12=1/(8.8856*F*C1)$$

$$R13=R12$$

Accordingly, the following exemplary values which are also shown in the circuit 148 are determined to be as follows:

$$C9=C3=0.0047 \text{ µfds}$$

$$C10=2C1=0.01 \text{ µfds}$$

$$R1=\tfrac{1}{2}F/(0.693*C1)=7.5 \text{ KOhms}$$

$$R12=1/(8.8856F*C1)=1200 \text{ Ohms}$$

$$R13=R12=1200 \text{ Ohms}$$

Resistors R3 and R6 are selected to be 1K Ohms each and are matched in value to help minimize errors in the actual frequency of operation. The frequency F is the required sine wave frequency −20,000 Hz. The value for C1 is selected arbitrarily, with a value of 0.0047 µfd being a good initial value for 20 KHz.

The output of the sine wave generator 154 is connected to the two-stage push-pull driver 156 in a dual rail through capacitors C5, C8. The output 158 of the two stage push-pull driver is connected to the primary winding L5$a$ and capacitor C4 in parallel to cause resonance at 20 KHz. This provides power from the frame side to the door side. The generator 150 is essentially a dual rail system that is capable of providing approximately 28 volt peak to peak signal to the primary winding L5$a$ of the power link split core transformer 20.

Returning to the schematic diagram of FIG. 13, that is, the frame side circuit, a coil winding set L4 enables communication to be received on the frame side from the door side. As illustrated, the door side would provide a 1.3 Mhz carrier modulated by an Amplitude Shift Keying (ASK) signal to coil L4$b$. The induced modulated signal is picked up by coil L4$a$ and passed through a third order high pass filter 160. The third order filter 160 removes the 20 KHz power signal which may be several times stronger than the modulated carrier.

Third order high pass filter 160, comprises an inverting first order filter 162 coupled with a non-inverting second order filter 164. The first order filter 162 is comprised of resistor R1 and capacitor C1. The second order filter 164 comprises capacitors C2, C3 and resistors R4, R5. The output 166 of the high pass filter 160 is applied to a rectifier diode D1 and filter capacitor C4 to convert a group of positive going half cycles to a single positive pulse. In operation, each positive pulse from the rectifier is an accumulation of approximately twelve half cycles of the carrier signal of 1.3 Mhz. In effect, this yields a maximum data rate on the order of approximately 100 KB, which is determined as follows:

$$1300000/12=108333.333 \text{ bps}$$

The rectified and filtered signal 168 is then applied to the negative input of a comparator 170. A sliding threshold signal 171 is applied to the positive input of the comparator 170. Comparator 170 may be a device such as an LM393 made by National Semiconductor of Santa Clara, Calif. The output 172 of the comparator 170 may then be supplied directly to a serial input data conversion device such as a Universal Asynchronous Receiver Transmitter (UART). The UART provides conversion of the serial stream to a parallel data stream for use by other devices.

The transmission of data from the frame side to the door side is accomplished by utilizing a carrier frequency which is provided by the oscillator U5. Oscillator U5 provides a 1.3 Mhz carrier signal that is connected to ASK modulator U4. Data 175 that is to be transmitted is then applied to the modulator U4 to provide an output signal 173. Output signal 173 is applied across coil L6a to induce a current in coil L6b on the door side where the data 175 may be parsed and utilized.

Figure 15:
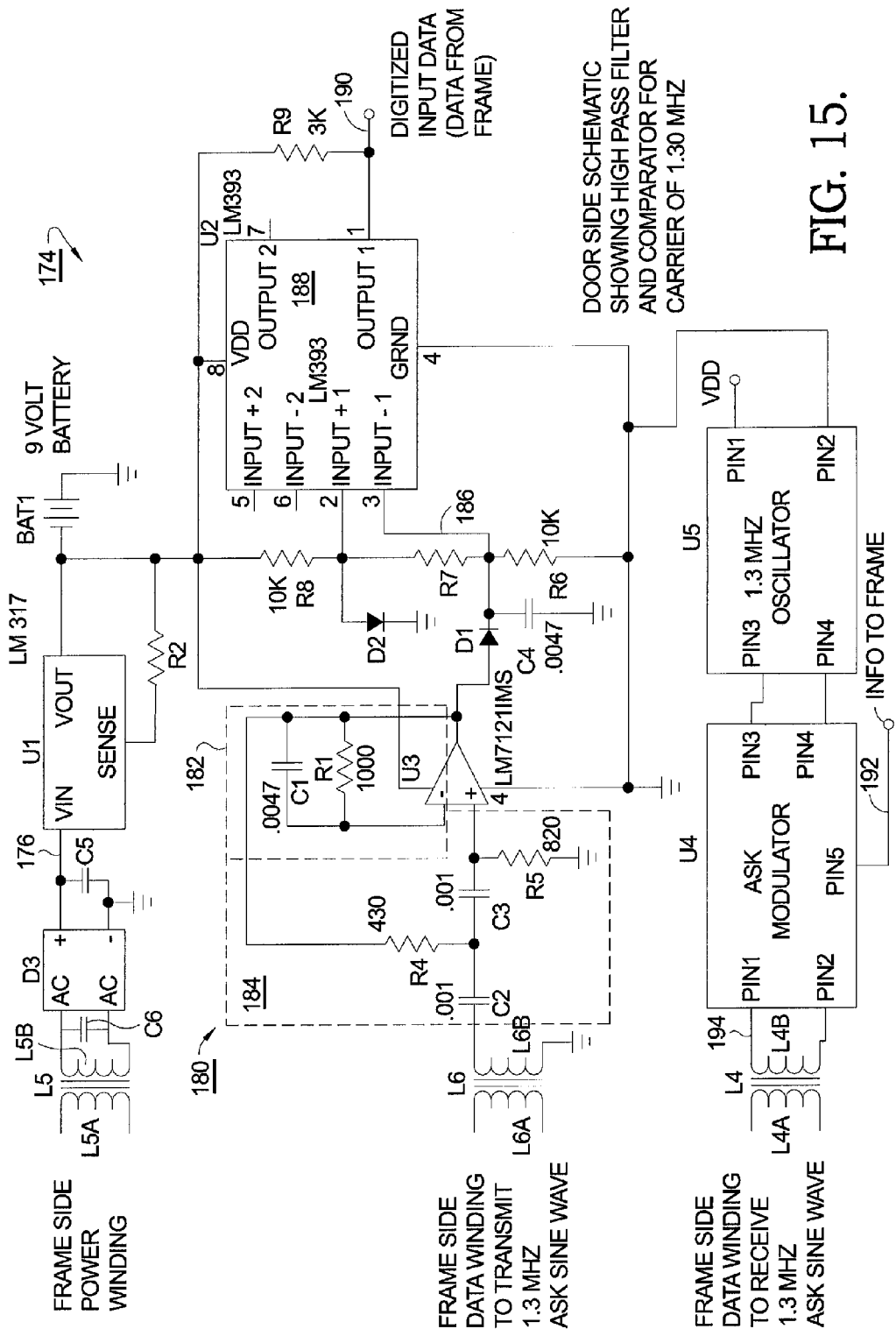
FIG. 15 is a schematic diagram of an alternate embodiment of an exemplary circuit for implementing the door side of the present invention to support bi-directional high speed data communications.

Turning next to the door side of the second embodiment of the present invention, FIG. 15 provides an illustrative schematic diagram of a circuit 174 as implemented on the door side of this alternate embodiment. Similar to the frame side, circuit 174 comprises power winding set L5 and data windings L4, L6.

Power from the frame side is provided through primary winding L5a and induces a current in secondary winding L5b. Capacitor C6 is in parallel with secondary winding 5b to cause resonance. The secondary winding L5b is in electrical connection with bridge rectifier D3. Bridge rectifier D3 converts the received sine wave to a full wave rectified signal 176. A filter capacitor C5 is located in parallel across the output terminals of the rectifier D1. The full wave rectified and filtered signal 176 is applied to a voltage regulator U1.

The regulator U1 provides the necessary voltage $V_{out}$ to charge a built-in battery BAT1 and provide power to the door side circuit 174. A voltage regulator such as LM 317, available from National Semiconductor Corp., Santa Clara, Calif., meets the necessary specifications to support the configuration of this embodiment of the present invention.

The power winding set L6 enables communication that originates on the frame side to be received on the door side. The frame side produces a 1.3 Mhz ASK sine wave in coil L6a, which in turn induces a current in coil L6b on the door side. The induced modulated signal is then passed through a third order high pass filter 180 (FIG. 15).

Similar to the frame side, the Third order high pass filter 180, comprises an inverting first order filter 182 coupled with a non-inverting second order filter 184 to produce a rectified and filtered signal 186. The rectified and filtered signal 186 is then applied to a rectifier diode D1 and filter capacitor C4, and then to the negative input of a comparator 188. Comparator 188 may be a device such as an LM393 made by National Semiconductor of Santa Clara, Calif. The output 190 of the comparator 188 represents digitized data received from the frame side.

Winding set L4 as previously described, enables communication to be received on the frame side from the door side. As illustrated, the door side would provide a 1.3 Mhz carrier utilizing the oscillator U5, the output of which is modulated by an Amplitude Shift Keying (ASK) modulator U4. Modulator U4 receives outgoing data 192. Outgoing data 192 is information that is present on the door side for transmission to the frame side. A modulated signal 194 comprising the outgoing data 192 is provided at coil L4b. Through induction, the modulated signal 194 is picked up by coil L4a on the frame side where the data can be extracted as described above relative to the signal that is picked up by coil L6b on the door side.

In a further aspect of the present invention, identical carrier frequencies may be utilized to transmit data in both directions such that both receivers would output the same data for transmission in either direction. In an even further aspect, different frequencies, which are separated by a sufficient amount to allow the use of band pass filters for distinguishing between power frequency of door or frame transmitters may be utilized. A resulting reduced data rate may occur in this instance due to bandwidth limitations.

While protruding assembly 12 and receiver assembly 18 have been described herein as separate assemblies, it is contemplated by this invention that the protruding assembly may be made part of and combined with a conventional door latch bolt assembly and the receiver assembly may be made part of and combined with a conventional strike assembly.

While the invention has been described with reference to preferred embodiments, it will be understood by those skilled in the art that various changes may be made and equivalents may be substituted for elements or components thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the following claims.

What is claimed is:

1. A system for providing electric power and communication from a first object to a second object wherein at least one of said first and second objects is moveable with respect to the other, comprising:
   a) a split core transformer wherein a first transformer portion is disposed on said first object adjacent said second object, and a second transformer portion is disposed on said second object adjacent said first object, and said first transformer portion having a first core, a primary coil winding, a primary coil rectifier, a sensing coil rectifier, and a sensing coil winding, and said second transformer portion having a second core, a secondary coil winding, and a secondary coil rectifier;
   b) first circuitry connected to said first transformer portion; and
   c) second circuitry connected to said second transformer portion;
   wherein application of a first alternating electric current through said first transformer portion induces a second alternating current in said second transformer portion, and
   wherein amplitude modulation of said second alternating electric current defines a communications signal between said first object and said second object.

2. A system in accordance with claim 1 wherein said first object is a door frame and said second object is a door hinged in said door frame.

3. A system in accordance with claim 2 wherein said second transformer portion is positioned in said door to directly oppose said first transformer portion in close proximity thereto only when said door is in a closed position with respect to said frame.

4. A system in accordance with claim 2 wherein a current is induced in said sensing coil winding from a modulated alternating signal of said primary coil winding, each of said coil windings being connected in parallel to said respective rectifier,
   said secondary coil rectifier output being edge detected and applied as a negative going trigger for a first timer and a second timer,
   said first timer output providing a first clocking signal utilized for data exchange with said second circuitry; and
   said second timer output providing a second clocking signal utilized for data exchange with said first circuitry.

5. A system in accordance with claim 4 wherein said data exchange between said first and second circuits occurs at a frequency that is essentially twice the frequency of the alternating voltage signal transferred between said frame and said door.

6. A system in accordance with claim 2 wherein output of said secondary rectifier is applied to a voltage regulator to charge an internal battery in said door.

7. A system in accordance with claim 2 wherein said secondary coil rectifier output is inverted and OR'ed with an outgoing data stream to lower the amplitude of individual half cycles of said secondary coil rectified signal to lower the impedance seen by said secondary coil winding.

8. A system in accordance with claim 2 wherein the output of said sensing coil rectifier is inverted and OR'ed with an outgoing data stream to lower the amplitude of individual half cycles of the rectified signal of said sensing coil.

9. A system in accordance with claim 2 wherein said first and second transformer portions are arranged in said door and frame respectively to minimize a gap between said first and second transformer portions when said door is in a closed position in said frame.

10. A system for providing electric power and data communication from a first object to a second object wherein at least one of said first and second objects is moveable with respect to the other, the system comprising:
- a first circuit located in said first object and a second circuit located in said second object; and
- a split core transformer wherein a first transformer portion is disposed in said first object adjacent said second object, and a second transformer portion is disposed in said second object adjacent said first object;
- wherein each of said first and second transformer portions comprise a power winding having a primary and a secondary coil, a first and a second data winding each having a transmitting and a receiving coil;
- wherein a power source is connected to said primary coil of said power winding to induce current into said secondary coil, which is connected to provide power to said second circuit;
- wherein said first circuit provides a carrier signal that is applied to said transmitting coil of said first data winding to transmit data items from said first object to said second object;
- wherein said second circuit receives said data via said receiving coil of said first data winding, for use in said second object;
- wherein said second circuit provides a carrier signal that is applied to said transmitting coil of said second data winding to transmit data items from said second object to said first object;
- wherein said first circuit receives said data items via said receiving coil of said second data winding, for use in said first object.

11. A system in accordance with claim 10 wherein said secondary coil of said power winding is connected to charge a battery, said battery providing power to said second circuit when said first and second objects are not positioned to allow current to be induced from said primary coil to said secondary coil.

12. A system in accordance with claim 10 wherein said first object is a door frame and said second object is a door hinged in said door frame.

13. A system in accordance with claim 12 wherein said second transformer portion is positioned in said door to directly oppose said first transformer portion in close proximity thereto only when said door is in a closed position with respect to said frame.

14. A system in accordance with claim 10 wherein said carrier signal is modulated by an amplitude shift keying (ASK) signal, said modulated signal applied to said transmitting coil, said modulated signal being picked up on said receiving coil and passed through a third order high pass filter to provide an output signal, said output signal being applied to a rectifier diode and a filter capacitor to provide positive pulses, said positive pulses applied to a comparator to provide a serial stream of said data items.

15. A system in accordance with claim 14 wherein said data items are communicated between said first and second objects up to a rate that is approximately 100 KB.

16. A system in accordance with claim 12 wherein said first and second transformer portions are arranged in said door and frame respectively to minimize a gap between said first and second transformer portions when said door is in a closed position in said frame.

17. A system in accordance with the system of claim 14, wherein said carrier signals for transmitting data in both directions between said first and second objects are at the same frequency.

18. A system in accordance with the system of claim 14, wherein said carrier signals for transmitting data in both directions between said first and second objects are at different frequencies, whereby a band pass filter may be utilized to distinguish between power frequency and door or frame transmitters.

19. A system for providing electric power and data communication from a first object to a second object wherein at least one of said first and second objects is moveable with respect to the other, the system comprising:
- a first circuit located in said first object and a second circuit located in said second object; and
- a split core transformer wherein a first transformer portion is disposed in said first object adjacent said second object, and a second transformer portion is disposed in said second object adjacent said first object;
- wherein each of said first and second transformer portions comprise a power winding, a first and a second data winding, each having a primary and a secondary coil portion;
- wherein a power source is connected to said primary coil portion of said power winding to induce current in the secondary coil portion of said power winding, said secondary coil portion being connected to provide power to said second circuit;
- wherein said first circuit includes an oscillator and modulator to provide a carrier signal for encapsulating data items for transmission from the primary side of said first data winding, to the secondary side of said first data winding i.e. from said first object to said second object;
- wherein said second circuit includes a third order high pass filter for filtering said carrier signal received on said secondary side of said first data winding, said third order filter connected to a comparator to extract said data items for use in said second object;
- wherein said second circuit includes an oscillator and modulator to provide a carrier signal for encapsulating data items for transmission from the primary side of said second data winding, to the secondary side of said second data winding i.e. from said second object to said first object;
- wherein said first circuit includes a third order high pass filter for filtering said carrier signal received on said secondary side of said second data winding, said third order filter connected to a comparator to extract said data items for use in said first object.

20. A system in accordance with claim 1, further comprising:
- a first receiver element configured for receiving said first transformer portion on said first object, said first receiver element including a first contact surface;
- a second receiver element configured for being slidably disposed in said second object and for receiving said second transformer portion, said second receiver element including a second contact surface; and
- a biasing member configured for being positioned between said second object and said second contact surface,
- wherein said biasing member biases said second contact surface toward said first contact surface so that said first contact surface engages said second contact surface to define a predetermined gap between said first transformer portion and said second transformer portion.

21. A system for providing electric power and communication from a first object to a second object wherein at least one of said first and second objects is moveable with respect to the other, said system comprising:
- a split core transformer including a first transformer portion and a second transformer portion, wherein said first transformer portion is configured for being disposed in said first object and wherein said second transformer portion is configured for being disposed in said second object;
- a first receiver element configured for receiving said first transformer portion on said first object, said first receiver element including a first contact surface;
- a second receiver element configured for being slidably disposed in said second object and for receiving said second transformer portion, said second receiver element including a second contact surface; and
- a biasing member configured for being positioned between said second object and said second contact surface,
- wherein said biasing member biases said second contact surface toward said first contact surface so that said first contact surface engages said second contact surface to define a predetermined gap between said first transformer portion and said second transformer portion.

22. A system in accordance with claim 21 wherein said first object is a door frame and said second object is a door hinged in said door frame.

23. A system in accordance with claim 21 wherein said first transformer portion is U-shaped and includes two legs, and wherein said first contact surface is disposed between said two legs of said first transformer portion.

24. A system in accordance with claim 23 wherein said first receiver element has two openings defined therein, and wherein said two legs of said first transformer portion are disposed in said two openings.

25. A system in accordance with claim 21, further comprising a first receiver housing configured for being coupled with said first receiver element, wherein said first transformer portion is disposed between said first receiver element and said first receiver housing.

26. A system in accordance with claim 21 wherein said second transformer portion is U-shaped and includes two legs, and wherein said second contact surface is disposed between said two legs of said second transformer portion.

27. A system in accordance with claim 26 wherein said second receiver element has two openings defined therein, and wherein said two legs of said second transformer portion are disposed in said two openings.

28. A system in accordance with claim 21 wherein said second contact surface protrudes outwardly from said second receiver element a first distance from said second receiver element, wherein an end surface of said second transformer portion protrudes outwardly a second distance from said second receiver element, and wherein said first distance is greater than said second distance.

29. A system in accordance with claim 28 wherein said second contact surface is formed in the shape of a ramp.

30. A system in accordance with claim 21 wherein said second receiver element includes an upper portion and a lower portion, wherein said second contact surface is formed in said upper portion, and wherein a spring retaining feature is formed in said lower portion and is configured for receiving said biasing member.

31. A system in accordance with claim 21, further comprising a second receiver housing configured for being disposed in said second object, said second receiver housing having an aperture defined therein configured for receiving said second transformer portion and said second contact surface, said second receiver housing including a flange surrounding at least a portion of said aperture, said flange being configured for engaging said second receiver element.

32. A system in accordance with claim 21 wherein said first transformer portion includes a first core, a primary coil winding, a primary coil rectifier, a sensing coil rectifier, and a sensing coil winding, and wherein said second transformer portion includes a second core, a secondary coil winding, and a secondary coil rectifier.

33. A system in accordance with claim 32, further comprising first circuitry connected to said first transformer portion, and second circuitry connected to said second transformer portion, wherein application of a first alternating electric current through said first transformer portion induces a second alternating current in said second transformer portion, and wherein amplitude modulation of said second alternating electric current defines a communications signal between said first object and said second object.

* * * * *

UNITED STATES PATENT AND TRADEMARK OFFICE
Certificate

Patent No. 8,294,302 B2                                        Patented: October 23, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Joshua Todd Peabody, Phoenix, AZ (US); Leland J. Hanchett, Jr., Cave Creek, AZ (US); Scott Sullivan, Glendale, AZ (US); and Dewey David, Glendale, AZ (US).

Signed and Sealed this Eighth Day of October 2013.

REXFORD N. BARNIE
*Supervisory Patent Examiner*
Art Unit 2836
Technology Center 2800